Patented Aug. 29, 1933

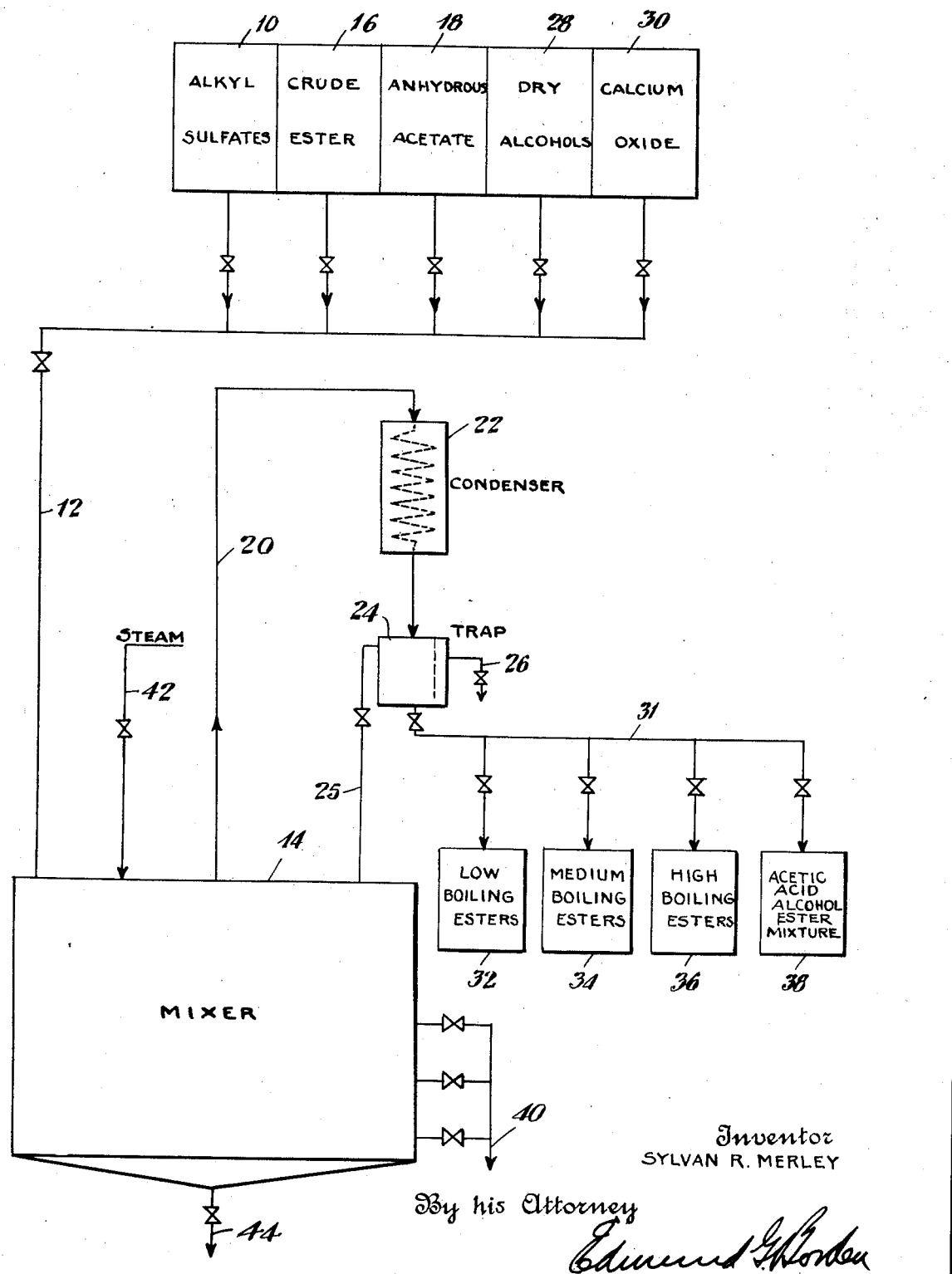

1,924,616

UNITED STATES PATENT OFFICE 1,924,616

PROCESS FOR MANUFACTURING ORGANIC ESTERS

Sylvan R. Merley, Dover, N. J., assignor to Doherty Research Company, New York, N. Y., a corporation of Delaware Application September 18, 1930
Serial No. 482,667

13 Claims. (Cl. 260—106)

This invention is an improvement on the process of manufacturing organic esters as described in the application filed by Sylvan R. Merley and Otto Spring, Serial No. 284,347, on June 11th, 1928.

The Merley and Spring application discloses the preparation of organic esters by the direct interaction between calcium acetate and alkyl sulfates. According to the process a hydrocarbon oil such as kerosene is used as a dispersive medium in mixing alkyl sulfates and crude calcium acetate and also for dissolving the resulting esters from the residue comprising sulfuric acid and calcium sulfate. The hydrocarbon oil is also used because of its high boiling range to allow for easier separation of the esters from the oil. It has been found however that hydrocarbon oils not having a constant boiling point gradually come over in the fractional distillation of higher esters, thereby contaminating the esters.

An object of this invention is to provide a process in which a solvent of constant high boiling point is used as a dispersive medium in combining alkyl sulfates and an anhydrous salt of an organic acid.

Another object is to provide a solvent which is easily separated by fractionating means from the resultant esters formed by the reaction between alkyl sulfates and salts of organic acids without contaminating such esters.

Another object of this invention is to neutralize any free mineral acid formed by the reaction between alkyl sulfates and salts of organic acids by the addition of a basic anhydride, thereby producing a precipitate rendering the remaining esters practically free from any mineral acid.

In the improved process of the present invention instead of using hydrocarbon oil which has an indefinite boiling temperature range from 400 to 500° F., a constant boiling ester such as hexyl acetate or any other acetate is used as the dispersive medium in the interaction between alkyl sulfates and calcium acetate. Hexyl acetate because of its constant boiling point is easily separated by distillation from the resultant esters formed by this process.

After the chemical reaction between the alkyl sulfates and the calcium acetate, the products formed are: esters, about 20% free sulfuric acid, free acetic acid and a precipitate of $CaSO_4$. To reduce the amount of free acetic acid, dry alcohol is added in sufficient quantity to react with all but a few percent of the excess organic acid. To neutralize all the free sulfuric acid, unslaked lime is added forming a precipitate which is allowed to settle out and is removed after all the liquids have been decanted from the reaction vessel.

Other objects and advantages of the improved process will be apparent from the following detailed description taken in connection with the attached drawing in which:—

The figure is a flow diagram of the improved process.

Referring to the drawing, the alkyl sulfates to be treated are conducted from a tank 10 by a valve controlled conduit 12 into a reaction chamber 14. This reaction chamber is of ordinary construction provided with a proper cooling, heating and agitating means for thoroughly mixing reacting substances, thereby preventing localized increases in temperature in the mixture. Crude ester such as hexyl acetate to be used in the process is conducted from a tank 16 into the mixer 14 by proper conduit means and thoroughly mixed with the alkyl sulfates at ordinary temperature. The crude ester is used not only as a solvent for the esters formed, but is also used for tempering the reaction between the alkyl sulfates and the calcium acetate. The amount of crude ester added is sufficient to dissolve all the resultant esters formed. It has been found that about one-fourth the total volume of liquids present in the reaction chamber in this step should be crude hexyl acetate. When the alkyl sulfate has been thoroughly dispersed throughout the hexyl acetate, an anhydrous salt of an organic acid such as calcium acetate is slowly added from a tank 18, while the agitation is continued.

Anhydrous salts of organic acids are used in this esterification in order to give direct reaction and to reduce to a minimum the amount of water formed. The mixture is then agitated under maintained room temperatures for about one hour in order to insure proper dispersion of the alkyl sulfates and the acetate, thus preventing local temperature increases in the mixture throughout the hexyl acetate. At the end of one hour the temperature in the mixer is raised to about 80° C. and maintained at that temperature for at least thirty minutes to insure a substantially complete reaction between the alkyl sulfate and the calcium acetate. By using anhydrous calcium acetate the yield of esters is higher than otherwise would be possible.

During the heating of the mixture in chamber 14 the vapors formed pass through a valve controlled conduit 20 into a water cooled condenser 22 from which the condensed vapors are conducted through a trap 24 back into the mixer 14 by a valved conduit 25. Whatever water may have been carried over with the vapors during the reflux treatment is separated in the trap 24 and forced out through the outlet 26, the water free condensate passing back into the mixer 14.

After the heat treatment there remains in the mixed esters, a precipitate of calcium sulfate, free acetic acid, about 20% of free sulfuric acid, and the hexyl acetate. In order to neutralize the free acetic acid which is present in substantial amounts in the mixture, dry alcohol is passed from tank 28 through conduit 12 into the mixer 14 while continuing the heating of the mixture. The dry alcohol used depends on the alkyl radical of the alkyl sulfates. For example, if the crude ester is a secondary butyl sulfate then dry secondary butyl alcohol would be added to esterify the free acetic acid in the mixture. If a mixture of alkyl sulfates is used then the dry alcohol to be added may be a mixture or depend on the ester desired. The dry alcohol combines with the free acetic acid evolved during the chemical reaction to form more esters. The amount of dry alcohol added should be sufficient in quantity to react with all but a few per cent of the excess free acetic and also to leave a mixture of esters and alcohol containing at least 85% esters after distillation.

The sulfuric acid remaining in the mixture after the above reactions is substantially all neutralized by adding a basic anhydride, such as calcium oxide or unslaked lime, which combines with the sulfuric acid to form calcium sulfate. The precipitated calcium sulfate becomes hydrated during the heat treatment with some of the water evolved from the alcohol esterification and forms a granular sediment (gypsum) which quickly settles to the bottom of the mixer. The mixture after the addition of the calcium oxide is again heated and refluxed for about fifteen minutes more, at the end of which time the reaction is substantially complete.

The valve in conduit 25 is now closed and the low boiling esters and alcohols present in the mixer are dry distilled direct from the mixer, condensed in the condenser 22, and conducted by a valved pipe 31 into a tank 32. The medium boiling esters coming over next are collected in valve controlled tank 34 while the high boiling esters are collected in the valve controlled tank 36. The esters in each tank are separated from each other by dry distillation, the esters coming over at their respective boiling temperatures or as mixtures. In the distillation, some of the dry alcohols present in the esters are carried over with the esters. The amount of alcohol present in any ester should not exceed 15% by volume, since the industries using such esters tolerate only such amounts of alcohol.

The last fraction coming into tank 36 may contain hexyl acetate and higher acetates depending upon the kind of alkyl sulfates treated in the process.

After all the esters and alcohols have been distilled over from mixer 14 there remains in the mixer a precipitate of hydrated calcium sulfate granular in appearance and some occluded free acetic acid, esters, and alcohols. The free acetic acid, esters and alcohols, occluded by the calcium sulfate are distilled with steam and separately collected in tank 38. This mixture in tank 38 may be dry distilled to separate out the esters and alcohols from the acetic acid.

Instead of dry distilling over the alcohols and esters as disclosed above, the precipitate present in the resultant mixture after complete treatment in the mixer 14 may be allowed to settle after which the clear liquid is decanted off to a still or storage through the decant pipes 40 and the hydrated calcium sulfate may then be steam distilled by allowing steam into the mixer through the valve controlled conduit 42, to separate out any occluded acetic acid and esters present therein. The hydrated calcium sulfate precipitate may be cleaned out of the mixer 14 through valve controlled conduit 44.

This process may be run either intermittently or made continuous by the use of a plurality of mixers in which case there would be common supply tanks, as represented in the sketch, feeding a number of mixers. Each mixer in such case would be supplied with separate distilling units connected with the crude ester and free acetic acid receiving tanks. The neutralization of the sulfuric acid at the end of each run allows for the easy separation of the esters and alcohols by direct distillation without danger of decomposing the same or the necessity of additional equipment such as filters, separators and stills.

During the esterification of the alkyl sulfates if a hexyl sulfate is present then hexyl acetate will be formed, which is recovered with the crude hexyl acetate used as a dispersive medium. In this process any other suitable ester such as isopropyl acetate may be used as the dispersive medium and solvent since it may be easily separated by distillation from the esters produced.

Having thus described this process, what is claimed as new is:

1. The process of making organic esters, which comprises mixing alkyl sulfates and hexyl acetate with vigorous agitation in the cold, then slowly adding an anhydrous salt of an aliphatic monocarboxylic acid, heating the mixture to a predetermined temperature at which substantially complete reaction results, adding dry aliphatic monohydroxy alcohol thereto to neutralize any excess organic acids evolved, heating and refluxing the resulting mixture, then adding anhydrous lime to neutralize the free sulfuric acid present in the mixture, and dry distilling off the alcohols and esters.

2. In the process of making alkyl organic esters from alkyl sulphates by reacting therewith an inorganic salt of an organic carboxylic acid, the improvement which comprises slowly adding said salt in a substantially anhydrous state and with constant agitation to a mixture of said sulphates with a stable organic ester readily separable by distillation from the esters to be formed, heating and refluxing the resulting mixture for a predetermined period of time to complete the reaction of the components thereof, adding dry alcohols to neutralize any organic acids formed and continuing the heating until substantially all of said acids are neutralized, adding a basic inorganic anhydride to the resulting mixture while heating the same to cause a precipitate to form therein, and separating the alcohols and esters from the mixture by dry distillation.

3. The process of making organic esters, which comprises the following steps, mixing alkyl sulfates with hexyl acetate as a dispersive agent, adding anhydrous calcium acetate thereto with thorough agitation, and the maintenance of the mixture cool, thereafter heating the mixture until the reaction between calcium acetate and alkyl sulfates is complete, the temperature during said reaction not exceeding 80° C., then adding with continued heating of the mixture, dry aliphatic monohydroxy alcohols to substantially esterify any organic acids evolved during the previous chemical reactions, thereafter adding unslaked lime to neutralize any sulfuric acid formed during the chemical action between the alkyl sulfates and calcium acetate, heating and dry distilling over the alcohols and esters, then steam distilling any occluded acetic acid from the remaining precipitate.

4. The process of making organic esters, comprising, substituting under practically anhydrous conditions an acetate radical for a sulfate radical in an alkyl sulfate in the presence of an ester with a boiling point above that of the alkyl esters to be formed, then esterifying any organic acids evolved during said substitution process with dry aliphatic monohydroxy alcohol heating and refluxing the mixture during said esterification, precipitating any inorganic acid evolved by adding a basic inorganic anhydride to the mixture, dry distilling the resultant mixture whereby alcohols and esters are removed, and subsequently steam distilling any acetic acid that may be occluded by the formed precipitate.

5. The process of making organic esters, which comprises combining an alkyl radical of an alkyl sulfate with an aliphatic monocarboxylic acid radical in the presence of an ester with a boiling point above that of the alkyl esters to be formed as a dispersive medium, heating the resulting mixture for a predetermined period of time for substantially complete reaction but not less than thirty minutes at 80° C., adding with continued heating dry aliphatic alcohol to combine with any excess organic acid formed to produce thereby more esters, adding unslaked lime to neutralize the sulfuric acid evolved during the esterification, dry distilling over the alcohols and esters, then steam distilling any occluded organic acid remaining in the formed precipitate.

6. The process of manufacturing an organic ester, which comprises heating a substantially anhydrous mixture of an alkyl ester of an inorganic acid and a salt of an aliphatic monocarboxylic acid, said mixture containing free inorganic acid, until the desired organic ester is formed, neutralizing the inorganic acid present in the resulting mixture, and dry distilling the organic ester from the neutralized mixture.

7. In the manufacture of organic esters from alkyl sulphates by reacting therewith a substantially anhydrous inorganic salt of an organic carboxylic acid, the improvement which comprises adding a stable organic ester readily separable by distillation from other esters to be formed to a mixture containing alkyl sulphates and also adding thereto said salt, heating the resulting mixture and neutralizing any sulphuric acid present therein with lime.

8. In the process of making organic esters from alkyl sulphates by reacting therewith an anhydrous salt of an aliphatic monocarboxylic acid, the improvement which comprises forming a mixture of said alkyl sulphates and a stable crude organic ester, then adding thereto said salt while thoroughly agitating and heating the resulting mixture, the temperature obtained during said heating not exceeding approximately 80° C., continuing the agitation and heating until the reaction in said mixture is substantially complete and adding a sufficient quantity of a basic inorganic anhydride to the resulting mixture to neutralize substantially all of the free mineral acid present therein.

9. In the process of making organic esters from alkyl sulphates by reacting therewith an anhydrous salt of an organic carboxylic acid, the improvement which comprises mixing a stable crude organic ester having a substantially constant boiling point with said sulphates, then adding thereto said salt while thoroughly agitating the resulting mixture, heating said resulting mixture to a predetermined temperature not exceeding approximately 80° C. until the reaction between said sulphates and said salt is substantially complete, and thereafter adding to the mixture a sufficient quantity of a basic inorganic anhydride to neutralize substantially all of the free mineral acid present therein.

10. In the process of making organic esters from alkyl sulphates by reacting therewith an anhydrous salt of an organic carboxylic acid, the improvement which comprises mixing said sulphates with a stable crude organic ester having a substantially constant boiling point, then adding said salt thereto while thoroughly agitating the resulting mixture, and heating said resulting mixture to a predetermined temperature not exceeding approximately 80° C. until the reaction between said sulphates and said salt is substantially complete.

11. In the process of making organic esters from alkyl sulphates by reacting therewith a substantially anhydrous salt of an organic carboxylic acid, the improvement which comprises mixing hexyl acetate with said sulphates with vigorous agitation in the cold, then slowly adding said salt thereto, heating the resulting mixture to a predetermined temperature at which substantially complete reaction occurs, thereafter adding a dry alcohol to the resulting mixture to neutralize any excess organic acid evolved, heating and refluxing the resulting mixture, then adding thereto substantially anhydrous lime to neutralize any free sulphuric acid present in the mixture and dry distilling off the alcohols and esters contained therein.

12. In the process of manufacturing an organic ester from an alkyl ester of an inorganic acid by reacting therewith a salt of an organic carboxylic acid, the improvement which comprises mixing said constituents and heating the resulting mixture until the desired organic ester is formed, neutralizing any inorganic acid present in the resulting mixture, and dry distilling the organic ester from the neutralized mixture.

13. In the process of manufacturing an organic ester from an alkyl ester of an inorganic acid by reacting therewith a salt of an organic carboxylic acid, the improvement which comprises forming a substantially cool anhydrous mixture of said alkyl ester and said salt with a stable organic ester having a substantially constant boiling point, heating the resulting mixture to a sufficient temperature until the desired organic ester is formed, and distilling the formed organic ester from said mixture.

SYLVAN R. MERLEY.